(12) United States Patent
Ishii

(10) Patent No.: US 11,838,628 B2
(45) Date of Patent: Dec. 5, 2023

(54) IMAGE CAPTURING APPARATUS, CONTROL METHOD THEREFOR, AND STORAGE MEDIUM

(71) Applicant: CANON KABUSHIKI KAISHA, Tokyo (JP)

(72) Inventor: Hirokazu Ishii, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/861,065

(22) Filed: Jul. 8, 2022

(65) Prior Publication Data

US 2022/0345636 A1 Oct. 27, 2022

Related U.S. Application Data

(63) Continuation of application No. 17/226,901, filed on Apr. 9, 2021, now Pat. No. 11,412,129.

(30) Foreign Application Priority Data

Apr. 21, 2020 (JP) ................................. 2020-075608

(51) Int. Cl.
*H04N 23/67* (2023.01)
*H04N 23/611* (2023.01)
*H04N 23/667* (2023.01)

(52) U.S. Cl.
CPC ......... *H04N 23/675* (2023.01); *H04N 23/611* (2023.01); *H04N 23/667* (2023.01)

(58) Field of Classification Search
CPC ......... H04N 5/232127; H04N 5/23219; H04N 5/23245; H04N 17/002; G06V 40/103; G06V 40/165; G06V 40/19
See application file for complete search history.

(56) References Cited

U.S. PATENT DOCUMENTS

| | | | |
|---|---|---|---|
| 2007/0263997 A1* | 11/2007 | Hirai | H04N 5/23219 348/E5.045 |
| 2016/0241775 A1* | 8/2016 | Fukuda | H04N 23/63 |
| 2019/0004400 A1* | 1/2019 | Ogawa | G01S 3/00 |
| 2019/0141254 A1* | 5/2019 | Kawarada | H04N 23/671 |

* cited by examiner

*Primary Examiner* — Yogesh K Aggarwal
(74) *Attorney, Agent, or Firm* — CANON U.S.A., INC., IP Division

(57) ABSTRACT

An image capturing apparatus comprises an image capturing device, a detection unit configured to detect the subject from the image captured by the image capturing device, a setting unit configured to set a plurality of focus detection frames inside the image based on a result of the detection by the detection unit, a focus detection unit configured to detect a focus state and reliability thereof in each of the plurality of focus detection frames; and a selection unit configured to select a main focus detection frame for performing focus adjustment based on results of the detections by the detection unit and the focus detection unit, wherein the selection unit is configured to cause a method of selecting the main focus detection frame to vary depending on a part of the subject detected by the detection unit.

17 Claims, 14 Drawing Sheets

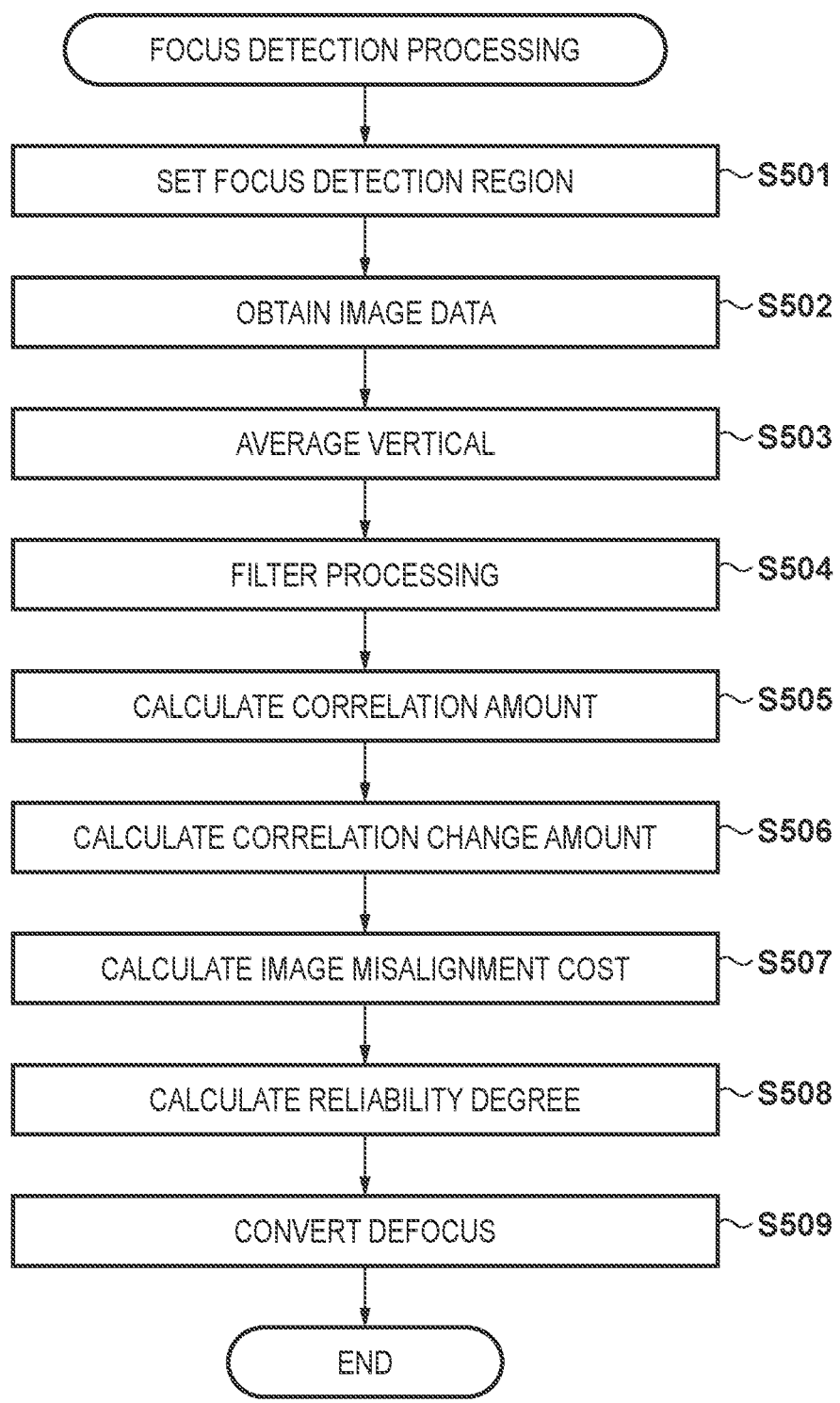

IMAGE CAPTURING APPARATUS, CONTROL METHOD THEREFOR, AND STORAGE MEDIUM

CROSS-REFERENCE TO RELATED APPLICATION

This application is a Continuation of U.S. application Ser. No. 17/226,901, filed Apr. 9, 2021, which claims priority from Japanese Patent Application No. 2020-075608, filed Apr. 21, 2020 which is hereby incorporated by reference herein in its entirety.

BACKGROUND OF THE INVENTION

Field of the Invention

The present invention relates to a focus adjustment technique in an image capturing apparatus.

Description of the Related Art

In recent years, a variety of AF methods (autofocus methods) that use an image sensor, such as an image capturing surface phase-difference AF method and a contrast AF method, have been put into practical use. Also, for such AF methods, a technique to achieve focus by identifying a region of a main subject has been established.

As this method, Japanese Patent Laid-Open No. 2010-191073 performs control to detect neighboring blocks that fall within a predetermined depth from among a plurality of AF frames, and select a main AF frame from among the blocks.

Also, Japanese Patent Laid-Open No. 2015-041901 improves the precision of identification of a main subject region by using color information in addition to detection of blocks that fall within a predetermined depth.

Furthermore, Japanese Patent Laid-Open No. 2019-121860 discloses a method of detecting a pupil and the like as body parts included in a face, judging the reliability degrees of the detection results in relation to the detected body parts, and setting a focus detection region in a region with a high detection reliability degree. In this way, focusing can be performed in a state where a main subject position has been identified with higher precision.

However, as the techniques described in Japanese Patent Laid-Open No. 2010-191073, Japanese Patent Laid-Open No. 2015-041901, and Japanese Patent Laid-Open No. 2019-121860 detect a region of a main subject with high precision and set a focus detection area based on the detection result, they do not always perform focus detection in a region appropriate for focus detection. If a region that was judged to be a main subject is not a region appropriate for focus detection, accurate focus adjustment may not be able to be performed.

SUMMARY OF THE INVENTION

The present invention has been made in view of the aforementioned problem, and performs focus adjustment accurately in a region with a higher priority degree while avoiding regions in which focus detection is difficult.

According to a first aspect of the present invention, there is provided an image capturing apparatus, comprising: an image capturing device configured to capture an image of a subject; at least one processor or circuit configured to function as a detection unit configured to detect the subject from the image captured by the image capturing device; a setting unit configured to set a plurality of focus detection frames inside the image based on a result of the detection by the detection unit; a focus detection unit configured to detect a focus state and reliability thereof in each of the plurality of focus detection frames; and a selection unit configured to select a main focus detection frame for performing focus adjustment based on results of the detections by the detection unit and the focus detection unit, wherein the selection unit is configured to cause a method of selecting the main focus detection frame to vary depending on a part of the subject detected by the detection unit.

According to a second aspect of the present invention, there is provided a control method for an image capturing apparatus that includes image capturing device for capturing an image of a subject, the control method comprising: detecting the subject from the image captured by the image capturing device; setting a plurality of focus detection frames inside the image based on a result of the detection in the detecting; performing focus detection to detect a focus state and reliability thereof in each of the plurality of focus detection frames; and selecting a main focus detection frame for performing focus adjustment based on results of the detections in the detecting and the focus detection, wherein the selecting causes a method of selecting the main focus detection frame to vary depending on a part of the subject detected in the detecting.

Further features of the present invention will become apparent from the following description of embodiments with reference to the attached drawings.

BRIEF DESCRIPTION OF THE DRAWINGS

FIG. 8 is a flowchart illustrating focus detection processing.

DESCRIPTION OF THE EMBODIMENTS

Figure 1:
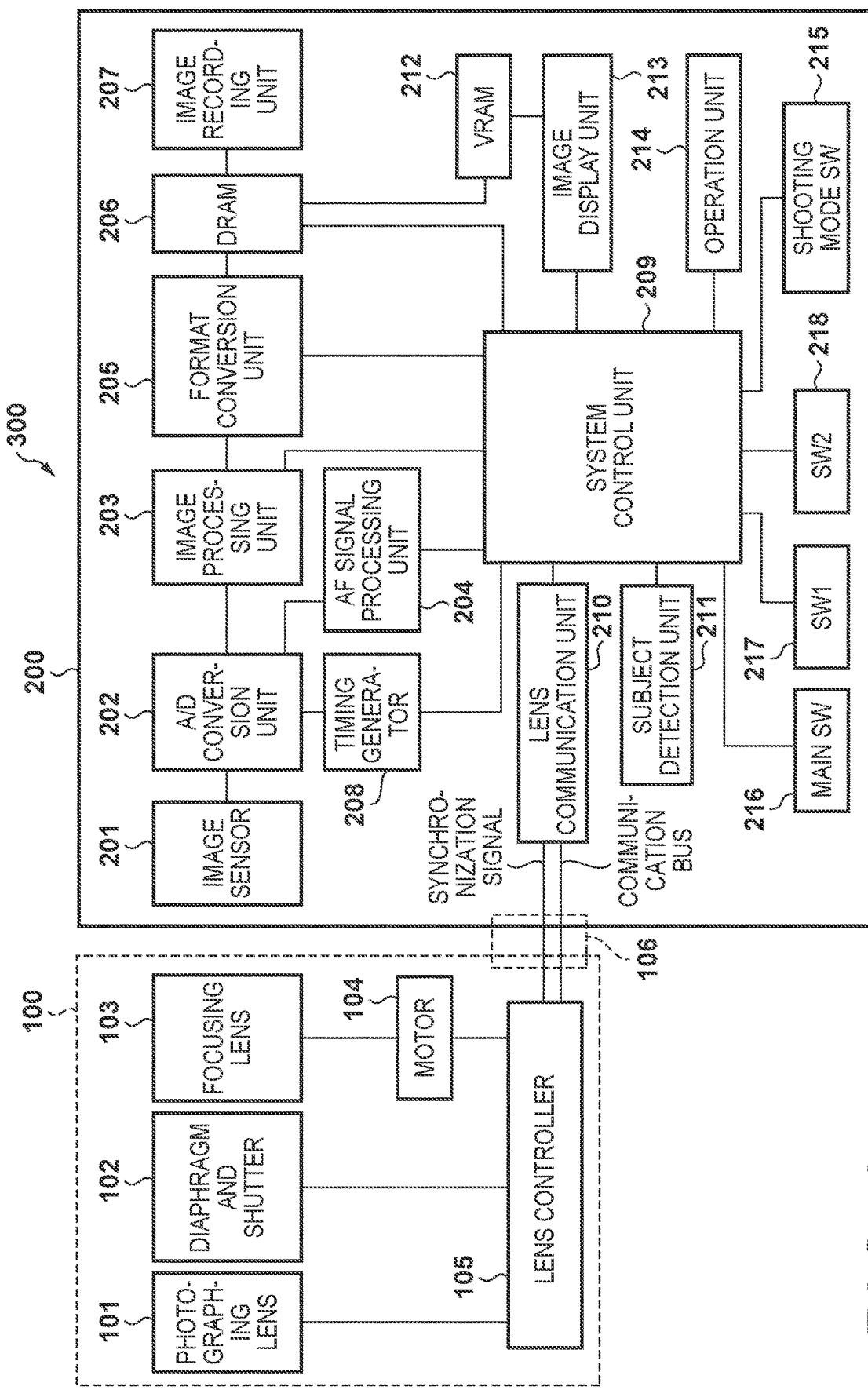
FIG. 1 is a block diagram showing a configuration of a digital camera, which is one embodiment of an image capturing apparatus of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 is a block diagram showing a configuration of a digital camera 300, which is one embodiment of an image capturing apparatus of the present invention.

In FIG. 1, the digital camera 300 is configured in such a manner that an interchangeable lens 100 is detachably (interchangeably) attached to a camera main body 200 via a non-illustrated mount unit that includes an electrical contact unit 106.

The interchangeable lens 100 includes a photographing lens 101 that has a zoom mechanism as a photographing optical system, a diaphragm and shutter 102 for controlling a light amount, and a focusing lens 103 for achieving focus on an image sensor, which will be described later. A motor 104 drives the focusing lens 103, and a lens controller 105 controls the entirety of the interchangeable lens 100.

The camera main body 200 includes an image sensor 201. The image sensor 201 includes a large number of pixels having photodiodes that convert reflected light from a subject into electrical signals. An A/D conversion unit 202 includes a CDS circuit that removes output noise of the image sensor 201 and a nonlinear amplification circuit that operates before A/D conversion, and converts analog signals from the image sensor 201 into digital signals. The camera main body 200 further includes an image processing unit 203, an AF signal processing unit 204, a format conversion unit 205, and a high-speed built-in memory (e.g., a random-access memory; hereinafter referred to as a DRAM) 206.

An image recording unit 207 is composed of a recording medium, such as a memory card, and an interface therefor. A timing generator 208 generates timing signals that control the timings of the operations of the digital camera 300, and a system control unit 209 controls the operations of the entirety of the digital camera, such as a shooting sequence. A lens communication unit 210 enables communication between the camera main body 200 and the interchangeable lens 100. A subject detection unit 211 detects a subject from captured image signals.

An image display memory (hereinafter referred to as a VRAM) 212 stores images for display. An image display unit 213 displays images, and also performs display for assisting an operation and display of the state of the camera. The image display unit 213 further displays a shooting screen and focus detection regions at the time of shooting. An operation unit 214 includes operation members for operating the camera from outside. A shooting mode switch 215 is an operation member for selecting a shooting mode, such as a macro mode and a sports mode. A main switch 216 is a switch for turning ON the power of the digital camera 300. When a release button is pressed halfway through, a release switch (SW1) 217 is turned ON and causes shooting preparation operations, such as AF and AE, to start. When the release button is fully pressed, a release switch (SW2) 218 is turned ON and causes shooting operations to start.

The DRAM 206 is used as a high-speed buffer as temporary image storing means, a working memory for image compression and decompression, and the like. The operation unit 214 includes various items. These various items include, for example, a menu switch for configuring various types of settings, such as settings of a shooting function and an image reproduction function of the image capturing apparatus, an operation mode changeover switch for switching between a shooting mode and a reproduction mode, and so forth.

The image sensor 201 is composed of a CCD or CMOS sensor. Light beams that have passed through the photographing optical system of the interchangeable lens 100 are formed as an image on a light receiving surface of the image sensor 201, and are converted by the photodiodes into signal charges corresponding to the amount of incident light. The signal charges accumulated in each photodiode are converted into voltage signals, and the voltage signals are read out sequentially from the image sensor 201 based on driving pulses from the timing generator 208 in accordance with an instruction from the system control unit 209.

Each pixel in the image sensor 201 used in the camera main body 200 includes two (a pair of) photodiodes A, B, and one microlens that is provided mutually for this pair of photodiodes A, B. Each pixel forms a pair of optical images on the pair of photodiodes A, B by dividing incident light via the microlens, and outputs, from this pair of photodiodes A, B, a pair of pixel signals (an A signal and a B signal) to be used for an AF signal, will be described later. Also, an image capturing signal (an A+B signal) can be obtained by adding the outputs of the pair of photodiodes A, B.

Compositing together a plurality of A signals and a plurality of B signals output from a plurality of pixels will yield a pair of image signals as an AF signal (in other words, a focus detection signal) to be used in AF based on an image capturing surface phase-difference detection method (hereinafter referred to as image capturing surface phase-difference AF). The AF signal processing unit 204 calculates a phase difference (hereinafter referred to as an image displacement amount), which is the amount of displacement between this pair of image signals, by performing correlation computation with respect to this pair of image signals, and further calculates a defocus amount (as well as a defocus direction and reliability (a focus state)) of the photographing optical system from this image displacement amount. Furthermore, it is assumed that the AF signal processing unit 204 calculates a defocus amount in a plurality of regions (focus detection regions) that can be designated on a screen.

Figure 2:
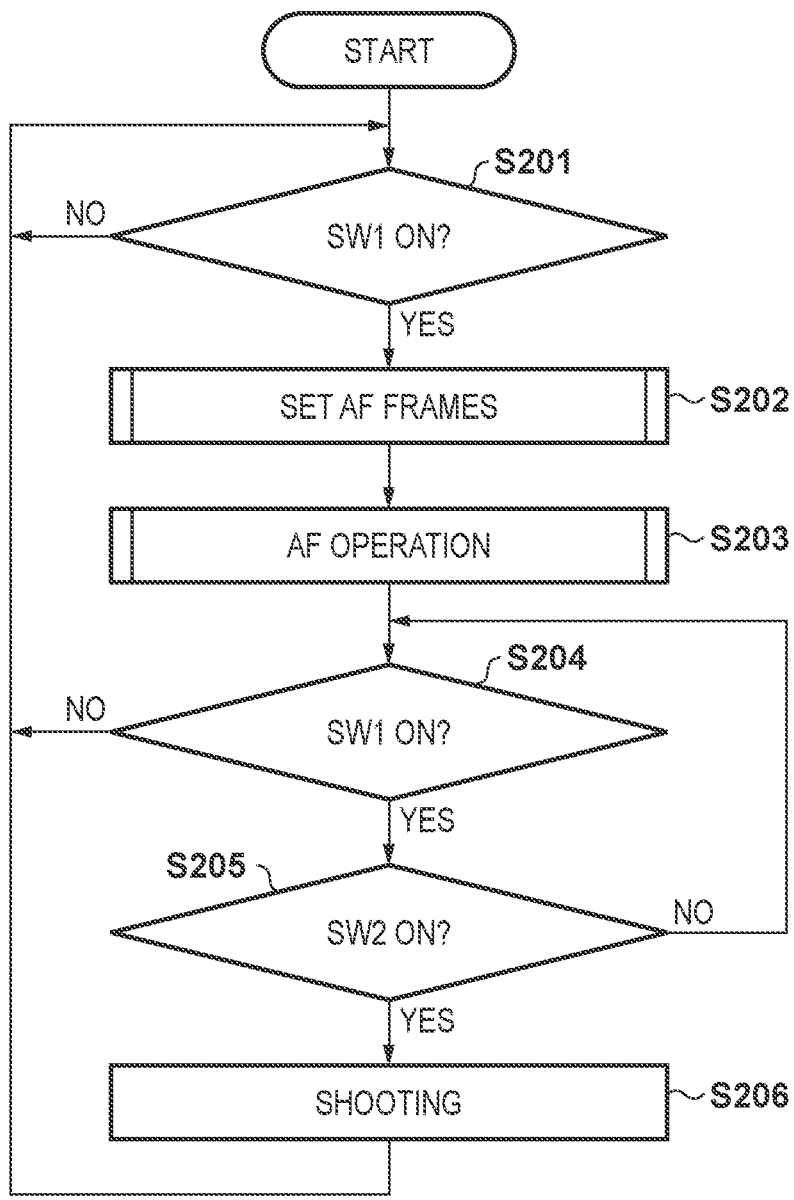
FIG. 2 is a flowchart illustrating the operations of the digital camera of one embodiment.

The operations of the digital camera 300 of the present embodiment will be described below using FIG. 2. FIG. 2 is a flowchart showing the operations of the digital camera 300.

First, in step S201, the system control unit 209 checks the state of the release switch (SW1) 217; the system control unit 209 proceeds to step S202 when this release switch is ON, and stands by when this release switch is OFF.

In step S202, the system control unit 209 sets AF frames (focus detection frames), which will be described later, with respect to the AF signal processing unit 204, and proceeds to step S203.

The system control unit 209 performs AF operations, which will be described later, in step S203, and proceeds to step S204.

In step S204, the system control unit 209 checks the state of the release switch (SW1) 217; processing proceeds to step S205 when this release switch is ON, and returns to step S201 otherwise.

In step S205, the system control unit 209 checks the state of the release switch (SW2) 218; processing proceeds to step S206 when this release switch is ON, and returns to step S204 otherwise.

The system control unit 209 performs shooting operations in step S206, and then returns to step S201.

Figure 3:
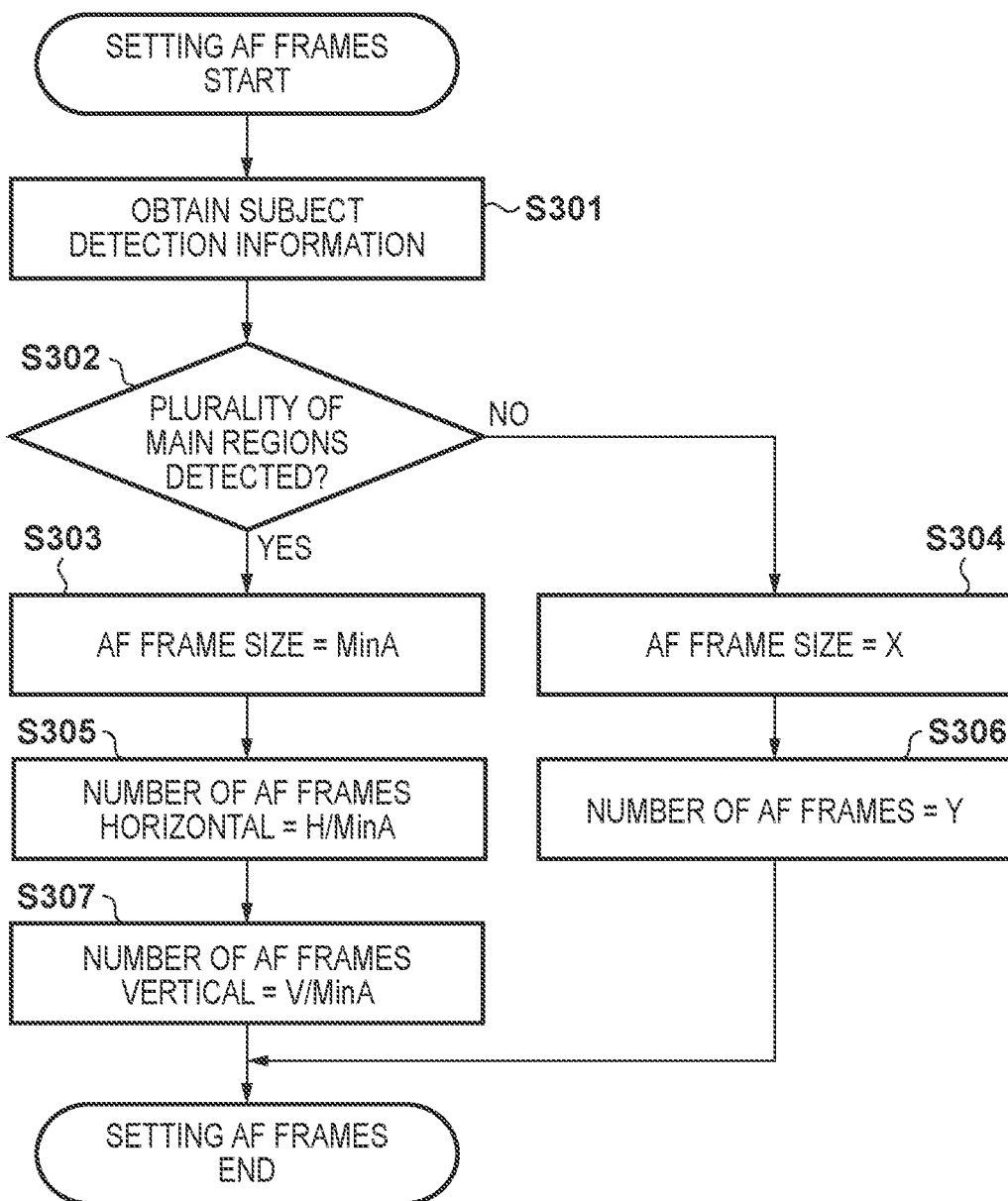
FIG. 3 is a flowchart for describing the operations for setting AF frames.

FIG. 3 is a flowchart for describing processing for setting focus detection frames in the present embodiment.

First, in step S301, the system control unit 209 obtains subject detection information from the subject detection unit 211. In the present embodiment, it is assumed that a human or an animal, such as a dog and a wild bird, as well as a main region inside this subject, is detected as a subject. A main region denotes a pupil, a face, and a body of a human or an animal. As a method of detecting these, for example, a learning method based on deep learning or an image processing method, which are known techniques, are used. In the present embodiment, as a known method can be used as a subject detection method, a detailed description of the subject detection method is omitted.

In step S302, the system control unit 209 judges whether a plurality of main regions were able to be detected from the result of detection by the subject detection unit 211. When a plurality of main regions were able to be detected, processing proceeds to step S303; otherwise, processing proceeds to step S304.

Figure 4A:
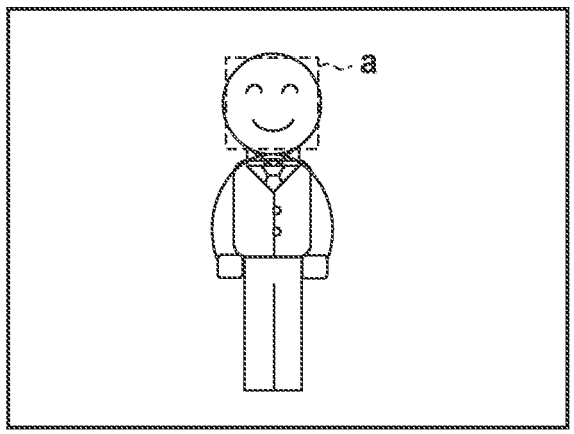
FIGS. 4A and 4B are diagrams showing the concept of a detected region regarding a face of a human.
Figure 5A:
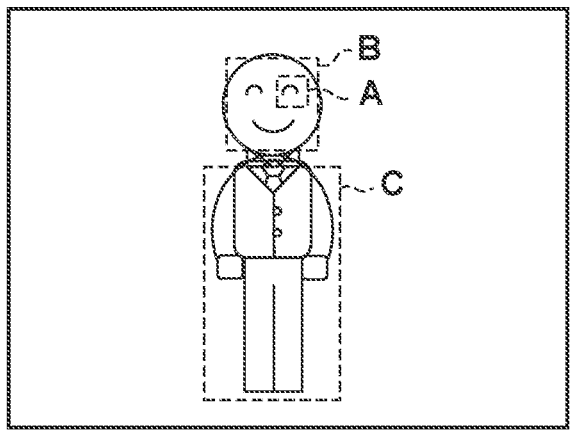
FIGS. 5A and 5B are diagrams showing the concept of detected regions regarding a pupil, a face, and a body of a human.
Figure 4B:
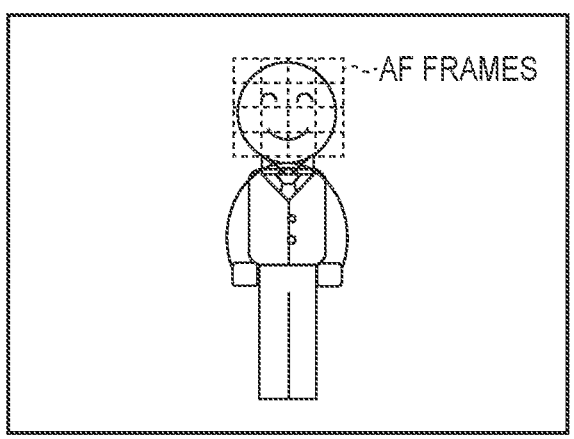

A description is now given of the concepts of detection for a case where one main region was detected, and for a case where a plurality of main regions were detected, using FIGS. 4A, 4B, 5A, and 5B. FIG. 4A shows a state where only a face a has been detected, whereas FIG. 5A shows a state where a pupil a, a face B, and a body C have been detected. It is assumed that a subject type, such as a human and an animal, and the central coordinates, the horizontal size, and the vertical size of each detected main region can be obtained from the subject detection unit 211.

In step S303, the system control unit 209 inputs the smallest value of the sizes of the detected main regions, that is to say, the smaller one of the values of the horizontal and vertical sizes of the region of the pupil A in FIG. 5A, as MinA, and regards MinA as one AF frame size.

Figure 5B:
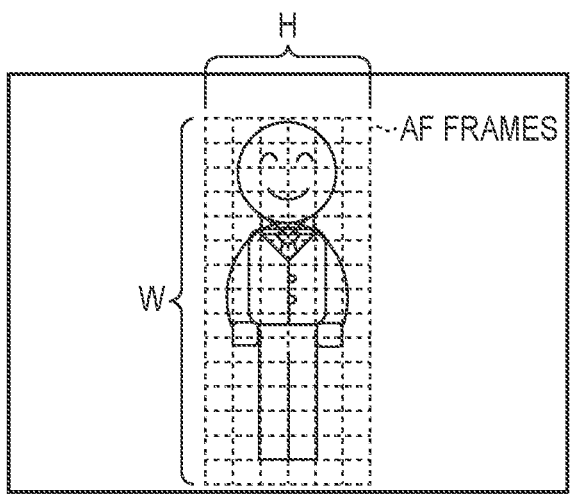

In step S305, the system control unit 209 obtains a horizontal size H shown in FIG. 5B, which includes all of the main regions, from the horizontal coordinates and the horizontal size of each detected main region, and determines the number of AF frames in the horizontal direction by dividing this H by the AF frame size MinA.

In step S307, the system control unit 209 obtains a vertical size V shown in FIG. 5B, which includes all of the main regions, from the vertical coordinates and the vertical size of each detected main region, and determines the number of AF frames in the vertical direction by dividing this V by the AF frame size MinA. Then, the setting of AF frames is ended.

Figure 6A:
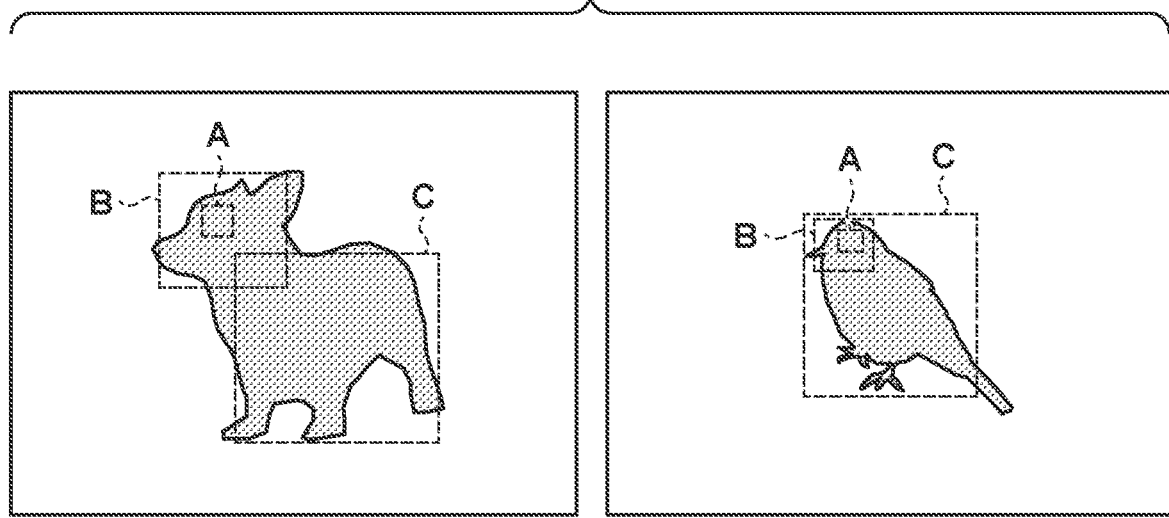
FIGS. 6A and 6B are diagrams showing the concept of detected regions regarding a pupil, a face, and a body of an animal.
Figure 6B:
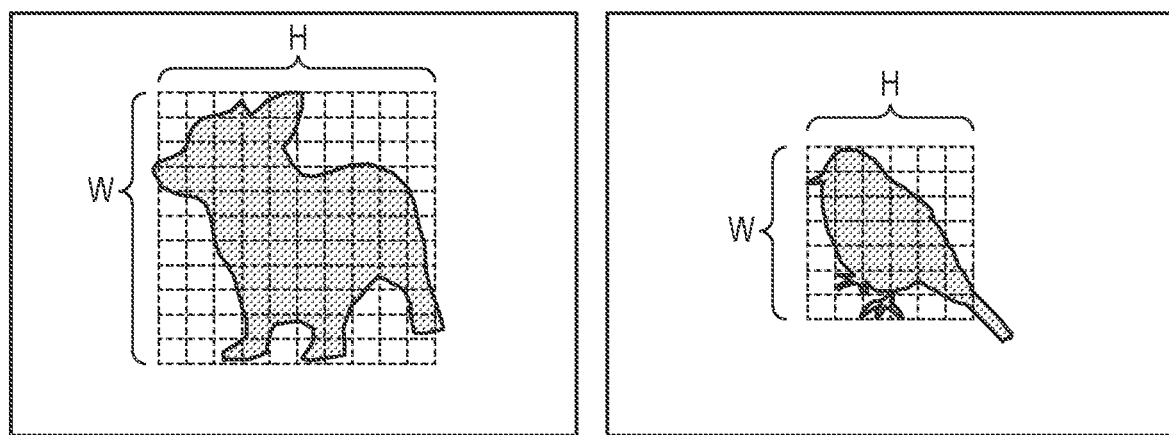

In the case of an animal as well, a control flow is similar to that for the case of a human, and the concepts of detection regions and the setting of AF frames are respectively as shown in FIG. 6A and FIG. 6B. Although the present embodiment incorporates square AF frames using the smallest size of main regions, the AF frame size may vary between the horizontal direction and the vertical direction, and the number of AF frames that can be computed by the system control unit 209 may be set.

In step S304, the system control unit 209 sets AF frames having a predetermined size X with respect to the detected face. As the size X, a pupil size estimated from the face may be set, or a frame size that can secure S/N and secure a sufficient focusing performance may be set in consideration of a low-illuminance environment. It is assumed that the estimated pupil size is set as the size X in the present embodiment.

In step S306, the system control unit 209 sets the number Y of AF frames that can include the region of the face a based on the AF frame size.

Figure 7A:
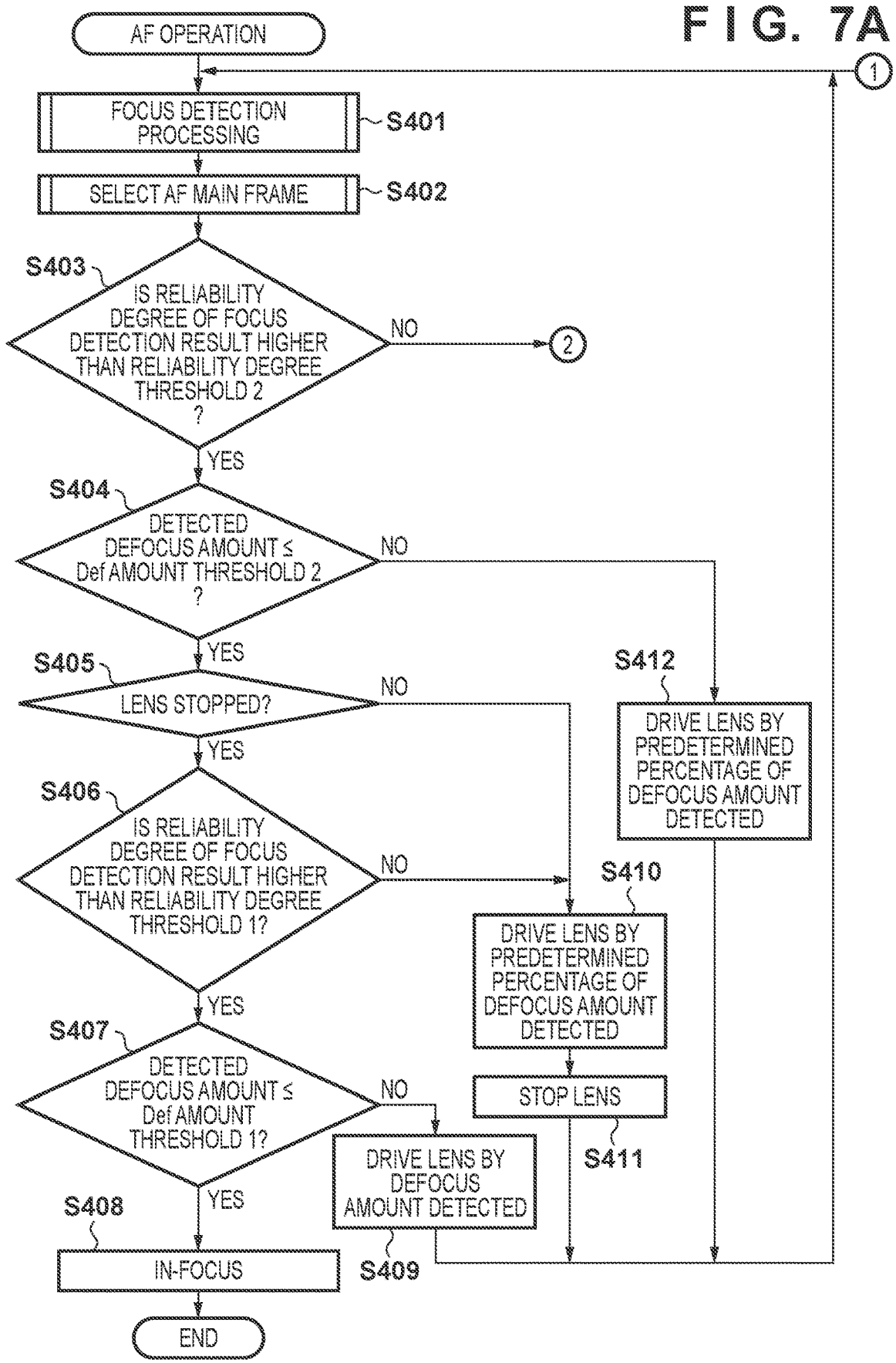
FIGS. 7A and 7B are flowcharts illustrating AF operations in the digital camera.
Figure 7B:
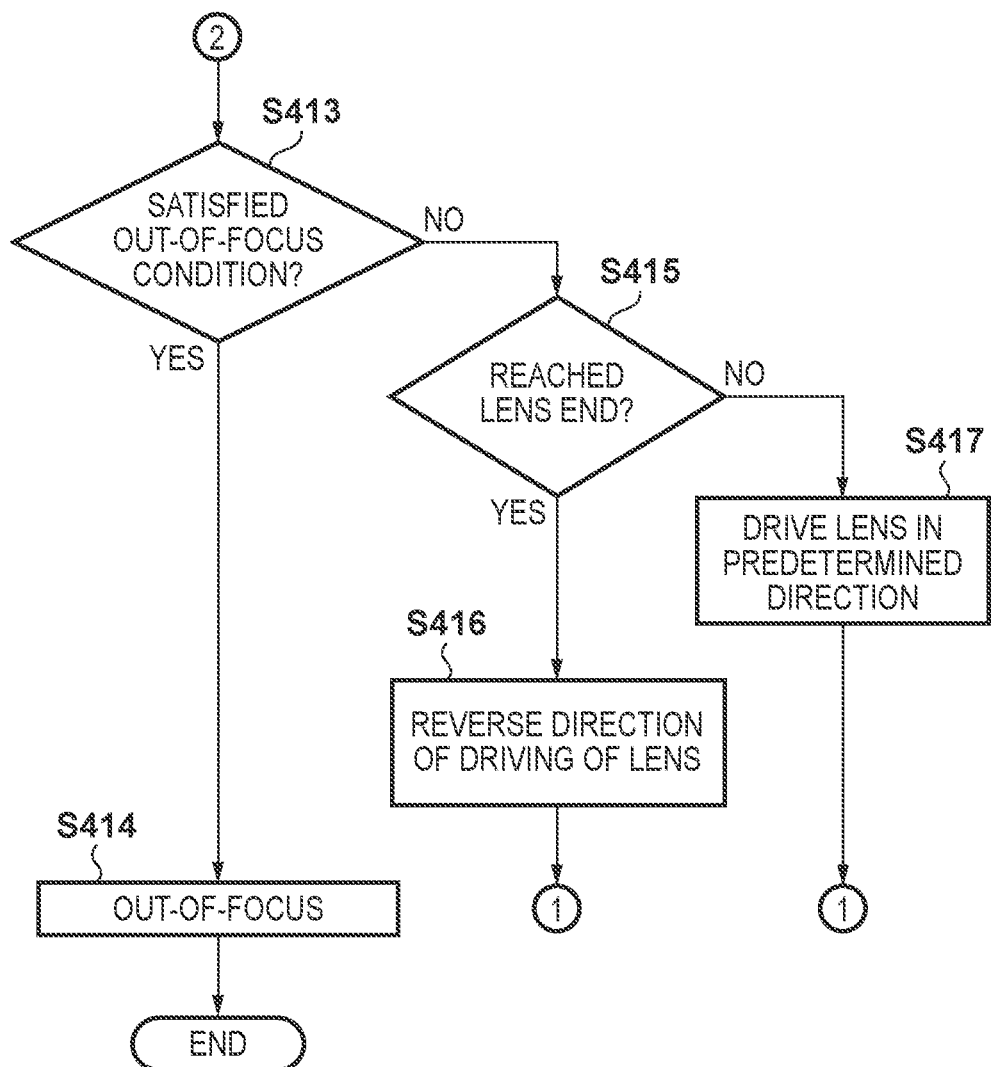

FIGS. 7A and 7B are flowcharts for describing the AF operations in step S203 of FIG. 2.

First, the system control unit 209 detects a defocus amount and reliability (a reliability degree) by performing focus detection processing in step S401, and proceeds to step S402. The focus detection processing will be described later.

The system control unit 209 selects an AF main frame with use of the reliability degree obtained in step S401 in step S402, and proceeds to step S403. The selection of the AF main frame will be described later.

In step S403, the system control unit 209 checks whether the reliability degree of the defocus amount detected in step S401 is higher than a reliability degree threshold 2 that has been set in advance. When the reliability degree is higher than the reliability degree threshold 2, processing proceeds to step S404; otherwise, processing proceeds to step S413. Here, the reliability degree threshold 2 is set in such a manner that a reliability degree lower than the reliability degree threshold 2 cannot guarantee the precision of the defocus amount, but can guarantee the direction of the focus position of the subject. In step S404, the system control unit 209 checks whether the defocus amount detected in step S401 is equal to or smaller than a Def amount threshold 2 that has been set in advance. When the defocus amount is equal to or smaller than the Def amount threshold 2, processing proceeds to step S405; otherwise, processing proceeds to step S412. Here, the Def amount threshold 2 is set in such a manner that a defocus amount equal to or smaller than the Def amount threshold 2 can control the focusing lens within the depth of focus if lens driving corresponding to the defocus amount is performed afterwards a predetermined number of times (e.g., three times) or less (e.g., an amount that is five times larger than the depth of focus is set as the Def amount threshold 2).

In step S405, the system control unit 209 checks whether the focusing lens 103 is in a stopped state; processing proceeds to step S406 when the focusing lens 103 is in the stopped state, and proceeds to step S410 otherwise.

In step S406, the system control unit 209 checks whether the reliability degree of the defocus amount detected in step S401 is higher than a reliability degree threshold 1 that has been set in advance. When the reliability degree is higher than the reliability degree threshold 1, processing proceeds to step S407; otherwise, processing proceeds to step S410. Here, the reliability degree threshold 1 is set in such a manner that a reliability degree higher than the reliability degree threshold 1 keeps variations in the precision of the defocus amount within a predetermined range (e.g., within the depth of focus).

In step S407, the system control unit 209 checks whether the defocus amount detected in step S401 is equal to or smaller than a Def amount threshold 1 that has been set in advance. When the defocus amount is equal to or smaller than the Def amount threshold 1, processing proceeds to step S408; otherwise, processing proceeds to step S409. Here, the Def amount threshold 1 is set in such a manner that a detected defocus amount equal to or smaller than the Def amount threshold 1 causes the focusing lens to be controlled within the depth of focus.

In step S408, the system control unit 209 determines that the current state is an in-focus state, and ends the present flow.

In step S409, the system control unit 209 drives the focusing lens 103 by the defocus amount detected in step S401, and then returns to step S401.

By performing the sequence of operations from step S405 to step S409, the defocus amount can be detected again in a state where the lens has stopped in a case where the reliability degree detected in step S401 is higher than the reliability degree threshold 1.

In step S410, the system control unit 209 drives the focusing lens 103 by a predetermined percentage of the defocus amount detected in step S401, and proceeds to step S411.

In step S411, the system control unit 209 issues an instruction for stopping the focusing lens 103, and returns to step S401.

In step S412, the system control unit 209 drives the focusing lens 103 by a predetermined percentage of the defocus amount detected in step S401, and returns to step S401. Here, the predetermined percentage is set so that the amount of lens driving is smaller than the defocus amount (e.g., 80 percent). Furthermore, the lens speed is set so that it is, for example, slower than the speed at which lens driving can be performed exactly in one frame period. This can prevent surpassing of the focus position of the subject when the detected defocus amount is not accurate, and can further perform the next lens driving while driving the lens without stopping the lens (overlap control).

In step S413, the system control unit 209 checks whether an out-of-focus condition has been satisfied. When the out-of-focus condition has been satisfied, processing proceeds to step S414; otherwise, processing proceeds to step S415. Here, the out-of-focus condition is a condition in which it is determined that there is no subject to be focused on, and is, for example, a case where lens driving has been completed throughout the movable range of the focusing lens 103. That is to say, it is a condition in which the focusing lens 103 has returned to the initial position after detecting both of the lens ends on the far side and the near side.

In step S414, the system control unit 209 determines that the current state is an out-of-focus state, and ends the present flow.

In step S415, the system control unit 209 checks whether the focusing lens 103 has reached the lens end on the far side or the near side. When the lens end has been reached, processing proceeds to step S416; otherwise, processing proceeds to step S417.

In step S416, the system control unit 209 reverses the direction of driving of the focusing lens 103, and returns to step S401. In step S417, the focusing lens 103 is driven in a predetermined direction, and processing returns to step S401. The focusing lens speed is set at, for example, the highest speed within the lens speed range in which the focus position is not surpassed when the defocus amount can be detected.

The focus detection processing in step S401 will be described using FIG. 8.

First, in step S501, the system control unit 209 sets a focus detection region having an arbitrary range inside the image sensor 201, and proceeds to step S502.

In step S502, the system control unit 209 obtains pairs of image signals (an A image and a B image) for focus detection from the image sensor 201 with respect to the focus detection region set in step S501, and proceeds to step S503.

In step S503, the system control unit 209 performs processing for adding and averaging the pairs of signals obtained in step S502 in the vertical direction, and then proceeds to step S504. This processing can alleviate the influence of noise of the image signals.

In step S504, the system control unit 209 performs filter processing for extracting signal components in a predetermined frequency band from the result of adding and averaging the signals in the vertical direction in step S503, and then proceeds to step S505.

In step S505, the system control unit 209 calculates a correlation amount from the signals resulting from the filter processing in step S504, and proceeds to step S506.

In step S506, the system control unit 209 calculates a correlation change amount from the correlation amount calculated in step S505, and proceeds to step S507.

In step S507, the system control unit 209 calculates an image displacement amount from the correlation change amount calculated in step S506, and proceeds to step S508.

In step S508, the system control unit 209 calculates a reliability degree indicating the extent to which the image displacement amount calculated in step S507 can be trusted, and proceeds to step S509.

In step S509, the system control unit 209 converts the image displacement amount into a defocus amount, and ends the focus detection processing.

Figure 9:
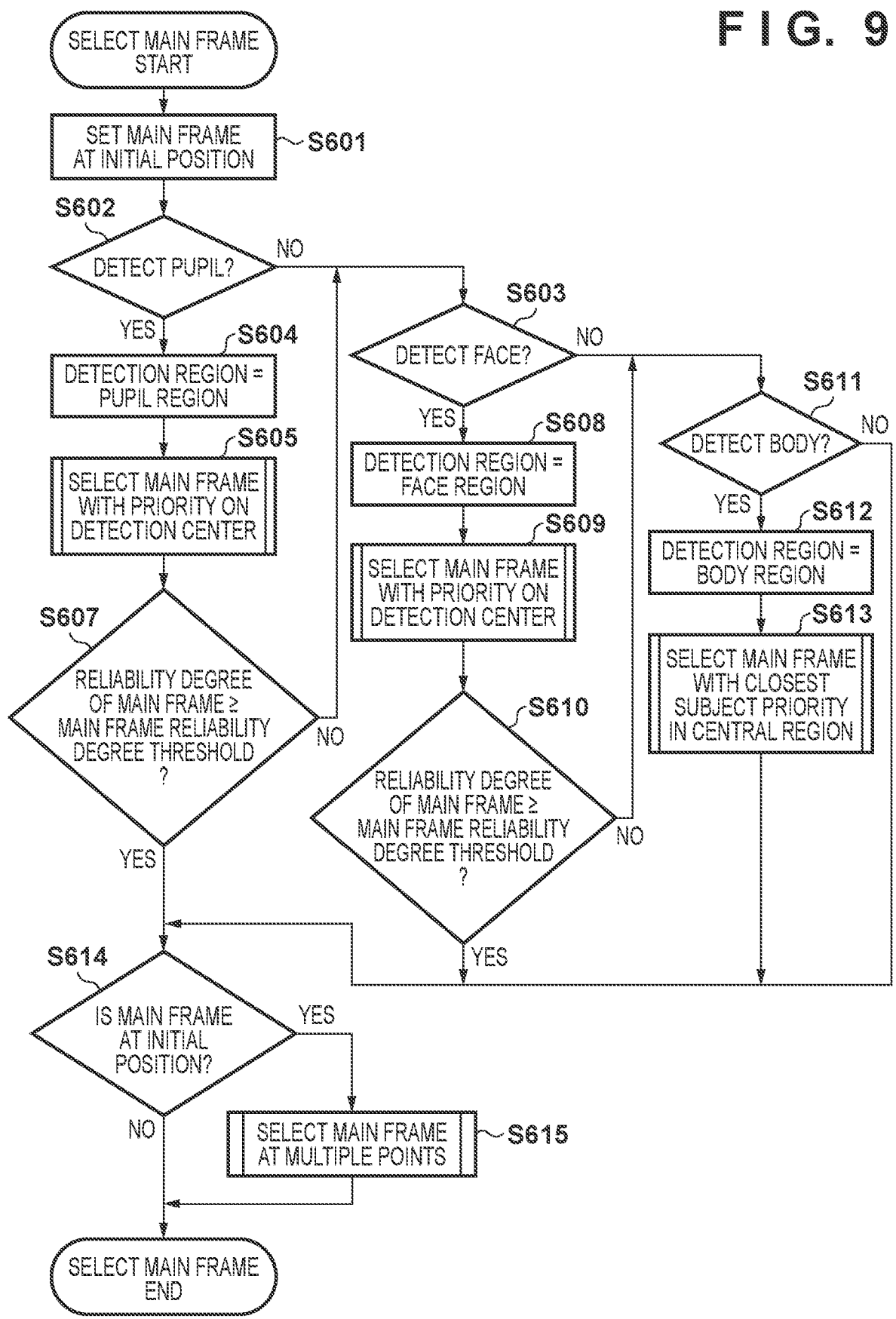
FIG. 9 is a flowchart illustrating the operations for selecting an AF main frame.

FIG. 9 is a flowchart illustrating the operations for selecting a main frame in step S402 of FIG. 7A. In selecting a main focus detection frame, the main focus detection frame is searched for in order from a subject with a high priority degree depending on parts of the subject.

First, in step S601, the system control unit 209 sets a main frame at an initial position as a preliminary preparation for the main frame selection.

In step S602, the system control unit 209 judges whether the subject detection unit 211 has detected a pupil of a subject. When the pupil has been detected, processing proceeds to step S604; when the pupil has not been detected, processing proceeds to step S603.

The system control unit 209 sets a pupil region as a main frame selection region in step S604, and performs the main frame selection with priority on the detection center, which will be described later, in the next step S605.

In step S607, the system control unit 209 judges whether the reliability degree of the selected main frame is equal to or higher than a main frame reliability degree threshold with respect to the result of selection of the main frame in the pupil region. When the reliability degree is judged to be equal to or higher than the threshold, processing proceeds to step S614; otherwise, processing proceeds to step S603. Step S607 is for determining whether the detected defocus amount of the main frame selected in the detected region of the pupil is equal to or smaller than a predetermined variation. For example, the aforementioned reliability degree threshold 1 or the like may be set as the main frame reliability degree threshold. When it is determined that it is difficult to select the main frame in the pupil region in step S607, processing proceeds to step S603 to select the main frame in a face region.

In step S603, the system control unit 209 judges whether the subject detection unit 211 has detected a face of the subject. When the face has been detected, processing proceeds to step S608; when the face has not been detected, processing proceeds to step S611.

The system control unit 209 sets a face region as the main frame selection region in step S608, and performs the main frame selection with priority on the detection center, which will be described later, in the next step S609.

In step S610, the system control unit 209 judges whether the reliability degree of the selected frame is equal to or higher than the main frame reliability degree threshold with respect to the result of selection of the main frame in the face region. When the reliability degree is judged to be equal to or higher than the threshold, processing proceeds to step S614; otherwise, processing proceeds to step S611. Step S610 is for determining whether the detected defocus amount of the main frame selected in the detected region of the face is equal to or smaller than a predetermined variation. For example, the reliability degree threshold 1 or the like may be set as the main frame reliability degree threshold, similarly to the case of the pupil region. When it is determined that it is difficult to select the main frame in the face region in step S610, processing proceeds to step S611 to select the main frame in a body region.

In step S611, the system control unit 209 judges whether the subject detection unit 211 has detected a body of the subject. When the body has been detected, processing proceeds to step S612; when the body has not been detected, processing proceeds to step S614.

The system control unit 209 sets a body region as the main frame selection region in step S612, and performs the main frame selection with closest subject priority in a central region, which will be described later, in the next step S613.

In step S614, the system control unit 209 judges whether the main frame is at the initial position in order to check whether the main frame was ultimately able to be set on one of the pupil, the face, and the body. When the main frame corresponds to an initial value, processing proceeds to step S615; otherwise, the main frame selection processing is ended.

In step S615, the system control unit 209 selects main frames at multiple points. Note that in step S615, while it is possible to adopt a method of, for example, selecting the main frame in a predetermined region inside the screen without using detection information, as this is not a main portion of the present embodiment, a detailed description thereof is omitted.

Figure 10:
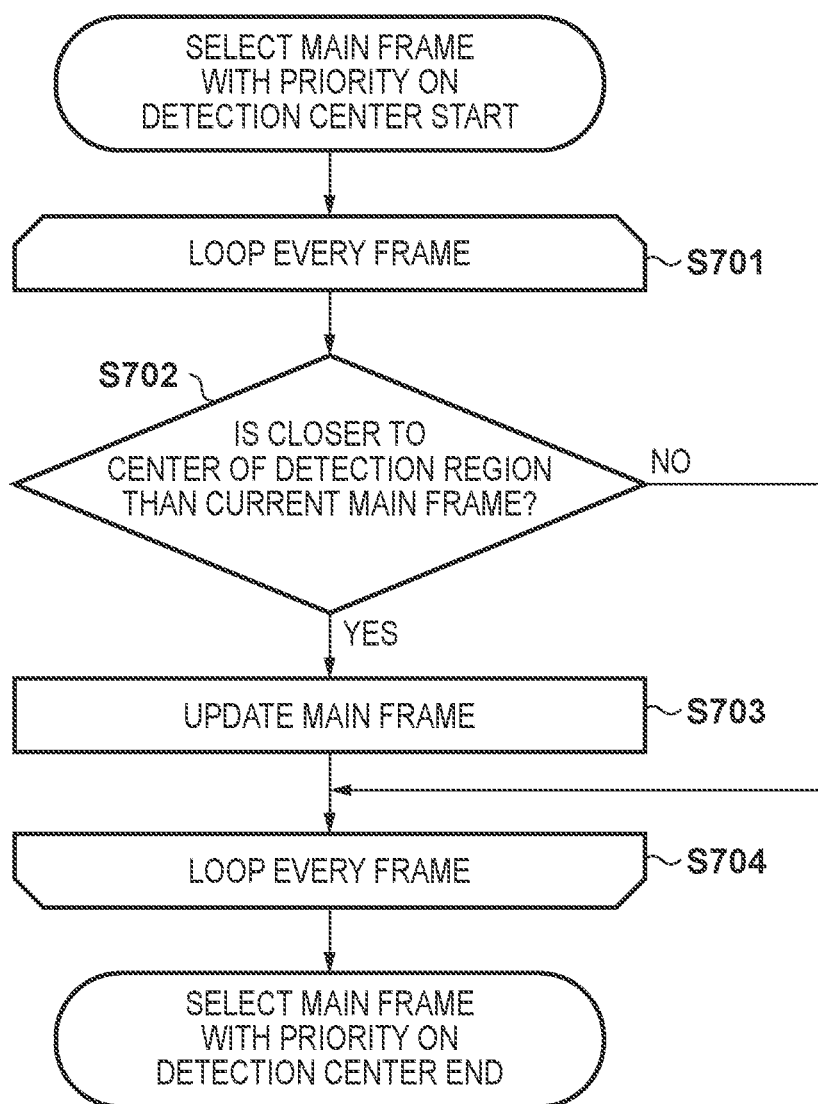
FIG. 10 is a flowchart illustrating the operations for selecting an AF main frame with priority on the detection center.
Figure 11:
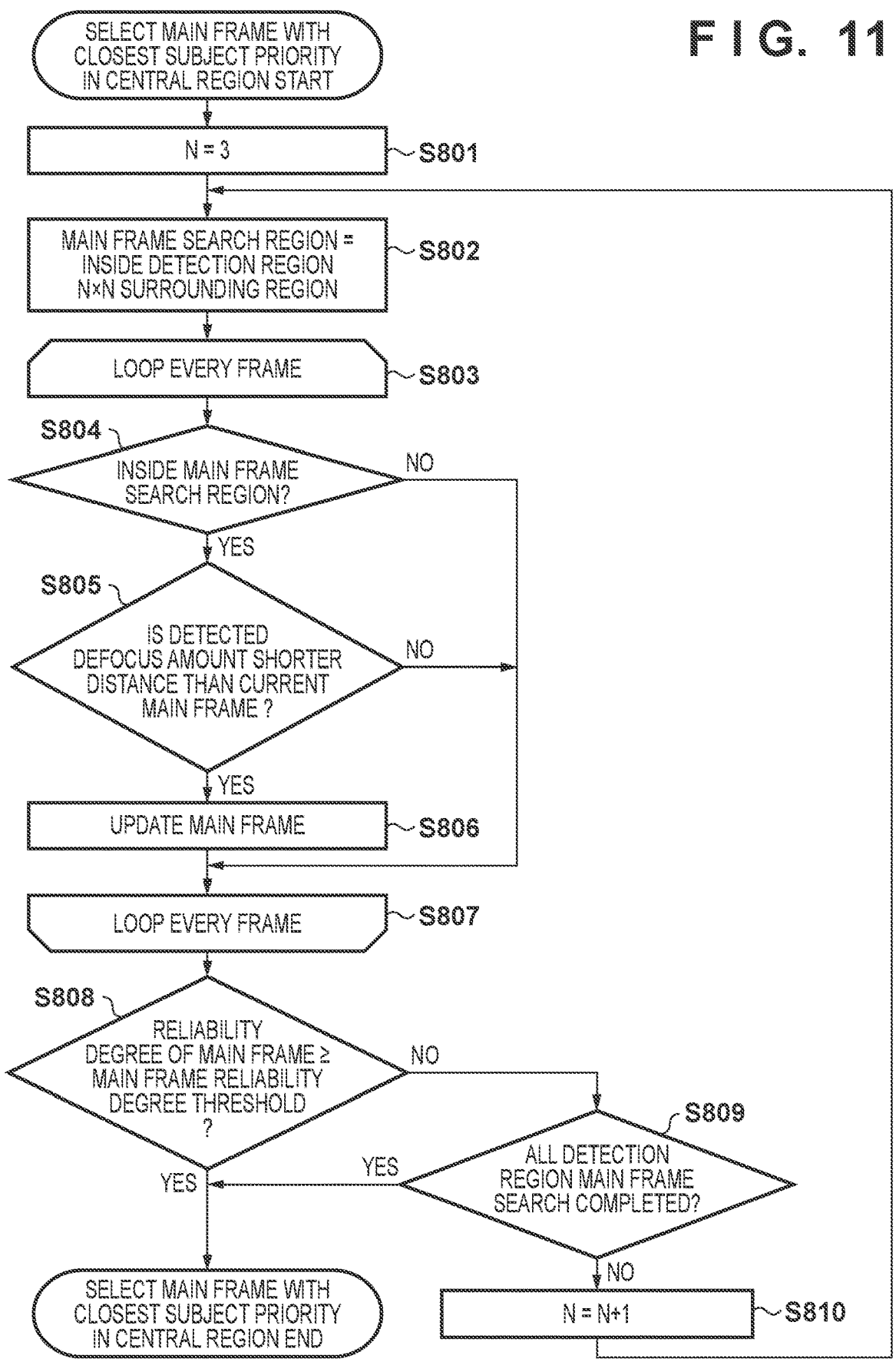
FIG. 11 is a flowchart illustrating the operations for selecting an AF main frame with closest subject priority in a central region.

Next, a description is given of main frame selection processing appropriate for each detected part with use of FIG. 10 and FIG. 11. In the present embodiment, when the detected part is a pupil or a face, the detected part takes up a relatively small region inside the subject, and thus main frame selection processing that gives importance to the position of the detection center is used. FIG. 10 is a flowchart of the operations for selecting the main frame with priority on the detection center.

From step S701 to step S704, similar processing is executed with respect to every focus detection frame inside the focus detection region.

In step S702, the system control unit 209 judges whether the focus detection frame is closer to the center of the detection region than the focus detection frame currently set as the main frame. When the focus detection frame is closer, processing proceeds to step S703 to update the main frame; when the focus detection frame is farther, processing proceeds to step S704. The foregoing processing is executed with respect to every focus detection frame, and the main frame selection processing is completed.

Next, a description is given of main frame selection processing for a case where the detected part is a body. When the detected part is a body, a relatively large region is detected inside the subject. Then, in selecting the main frame in a body region that has a possibility of having a complex subject shape, main frame selection processing is performed while giving importance to a frame in which the subject is not absent in a central region with a high probability of the existence of the subject inside the detected region (closest subject priority). FIG. 11 is a flowchart showing the operations for selecting the main frame with closest subject priority in the central region.

In step S801, the system control unit 209 configures the initial setting of the number of frames for setting a main frame search region in the next step S802.

The system control unit 209 sets the main frame search region in step S802, and proceeds to step S803. From step S803 to step S807, similar processing is executed with respect to every focus detection frame inside the focus detection region.

In step S804, the system control unit 209 determines whether the focus detection frame is inside the main frame search region; when the focus detection frame is inside the main frame search region, processing proceeds to step S805. In step S805, the system control unit 209 determines whether the defocus amount of the focus detection frame corresponds to a shorter distance than the detected defocus amount of the main frame currently set. When the defocus amount of the focus detection frame corresponds to a shorter distance, the main frame is updated in the next step S806; when the defocus amount of the focus detection frame does not correspond to a shorter distance, processing proceeds to step S807, thereby proceeding to the determination about the next focus detection frame. The foregoing processing is executed with respect to every focus detection frame, and processing proceeds to step S808.

In step S808, the system control unit 209 judges whether the reliability degree of the detected defocus amount of the selected main frame is equal to or higher than a predetermined threshold. When the reliability degree is judged to be equal to or higher than the predetermined threshold, the main frame selection processing is completed. When the reliability degree is judged to be lower than the predetermined threshold in step S808, processing proceeds to steps S809 and S810, the main frame search region is enlarged, and the aforementioned steps S802 to S808 are executed. When the main frame search has been completed in the entire focus detection region in step S809, the main frame selection processing is completed.

Application of the present embodiment enables the execution of accurate focus adjustment in a region with a higher priority degree while avoiding regions in which focus detection is difficult in a case where a plurality of subject parts have been detected. For example, in a case where a subject is an animal that moves around against the photographer's intention, such as a dog, a cat, and a bird, focus adjustment can be performed in a part with a higher priority degree while avoiding parts in which it is difficult to perform focus detection due to a low reliability degree of the detected defocus amount.

Although one embodiment of the present invention has been described in detail thus far, the present invention is not limited to the foregoing embodiment, and various embodiments that do not depart from the principles of this invention are also encompassed within the present invention.

Figure 12:
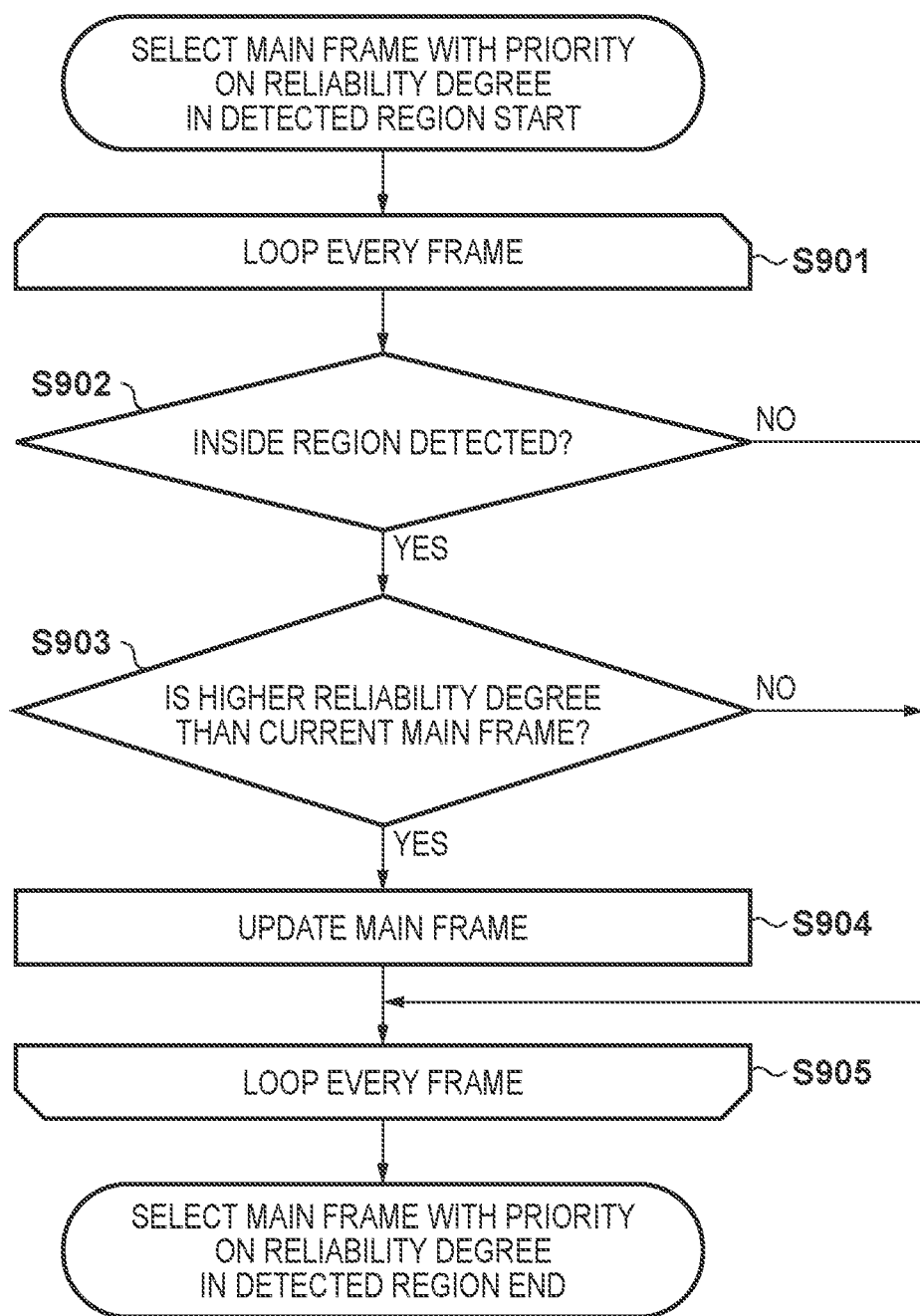
FIG. 12 is a flowchart illustrating the operations for selecting an AF main frame with priority on the reliability degree of a detected region.

In the present embodiment, when a pupil or a face has been detected, main frame selection processing that gives importance to the position of the detection center is used, whereas when a body has been detected, main frame selection processing that gives importance to a frame in which the subject is not absent in a central region with a high probability of the existence of the subject inside the detected region is used. With respect to a subject that tends to have a relatively small size inside the subject, such as a pupil and a face, main frame selection processing that gives importance to the position of the detection center is executed under the assumption that there is almost no displacement in the detected position of the subject. However, for example, when the displacement in the detected position needs to be taken into consideration, processing for selecting a focus detection frame that has a detected focus amount with a higher reliability degree as the main frame may be performed. FIG. 12 is a flowchart showing the operations for selecting the main frame with priority on a focus detection frame that has a detected defocus amount with a high reliability degree inside the detected region.

From step S901 to step S905, similar processing is executed with respect to every focus detection frame inside the focus detection region. In step S902, the system control unit 209 judges whether the focus detection frame is inside the region of the detected part of the subject. When the focus detection frame is inside the region, whether the focus detection frame has higher reliability than the focus detection frame currently set as the main frame is judged in the next step S903; when the focus detection frame has higher reliability, processing proceeds to step S904 to update the main frame. When it is judged that the focus detection frame has lower reliability than the focus detection frame currently set as the main frame in step S903, processing proceeds to step S905, this determination is made with respect to every focus detection frame, and the main frame selection processing is completed.

Figure 13:
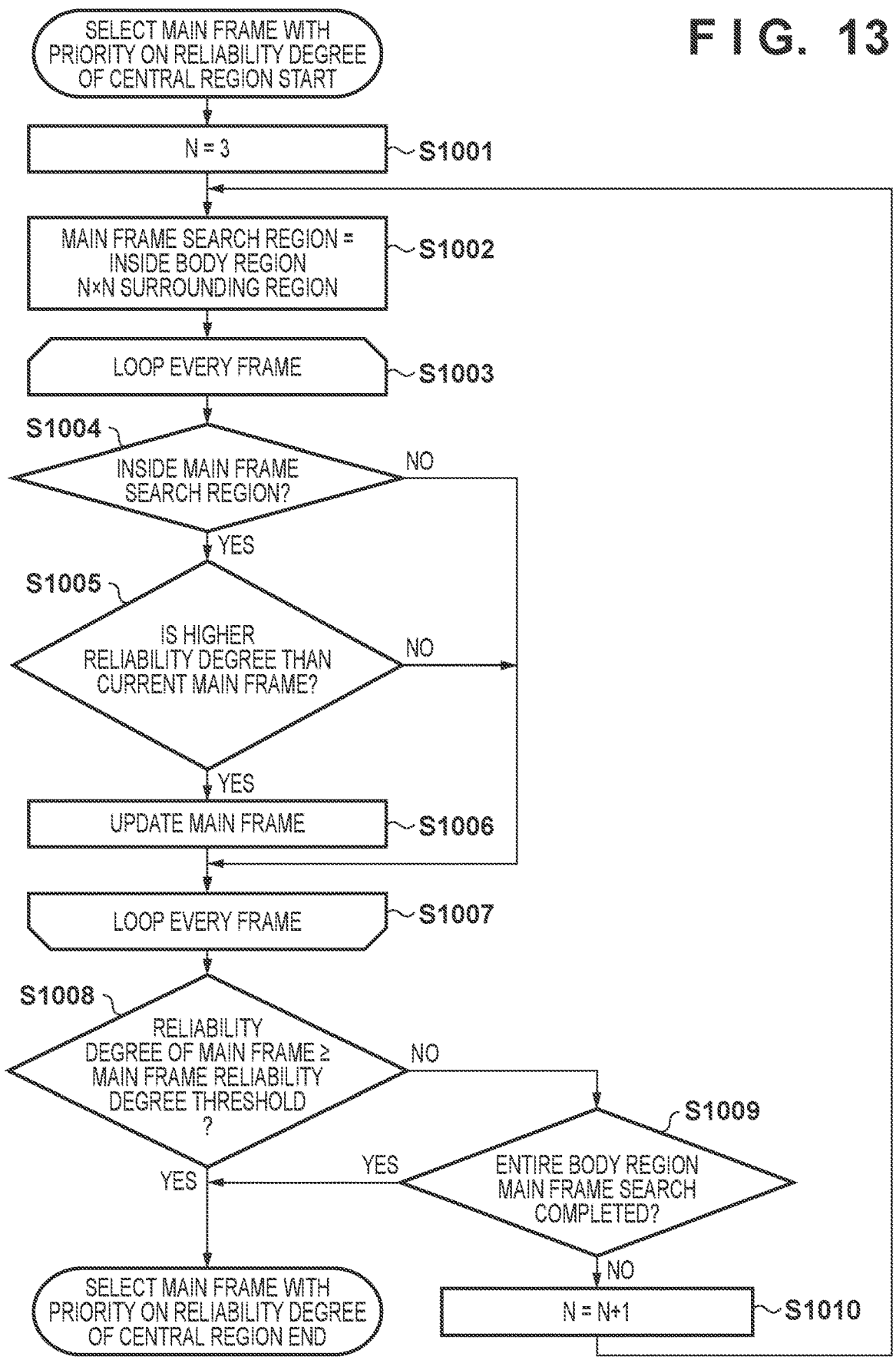
FIG. 13 is a flowchart illustrating the operations for selecting an AF main frame with priority on the reliability degree of a central region.

Furthermore, in the present embodiment, in a case where a body has been detected and the main frame has a low reliability degree on a pupil or a face, main frame selection processing that gives importance to a frame in which the subject is not absent in a central region with a high probability of the existence of the subject is used with respect to the region of the body in consideration of the degree of complexity of the subject shape. However, for example, when the degree of complexity of the subject shape need not be taken into consideration, processing for selecting a focus detection frame that has a detected defocus amount with a higher reliability degree as a main frame may be performed. FIG. 13 is a flowchart showing the operations for selecting the main frame with priority on the reliability degree of the central region.

In step S1001, the system control unit 209 configures the initial setting of the number of frames for setting a main frame search region in the next step S1002.

The system control unit 209 sets the main frame search region in step S1002, and proceeds to step S1003. From step S1003 to step S1007, similar processing is executed with respect to every focus detection frame inside the focus detection region.

In step S1004, the system control unit 209 determines whether the focus detection frame is inside the main frame search region; when the focus detection frame is inside the main frame search region, processing proceeds to step S1005. In step S1005, whether the focus detection frame has the detected defocus amount with a higher reliability degree than the main frame currently set is determined. When the focus detection frame has the detected defocus amount with a higher reliability degree, the main frame is updated in the next step S1006; when the focus detection frame has the detected defocus amount with a lower reliability degree, processing proceeds to S1007, thereby proceeding to the determination about the next focus detection frame. The foregoing processing is executed with respect to every focus detection frame, and processing proceeds to step S1008.

In step S1008, the system control unit 209 judges whether the reliability degree of the detected defocus amount of the selected main frame is equal to or higher than a predetermined threshold. When the reliability degree is judged to be equal to or higher than the predetermined threshold in step S1008, the main frame selection processing is completed. When the reliability degree is judged to be lower in step S1008, processing proceeds to steps S1009 and S1010, the main frame search region is enlarged, and the aforementioned steps S1002 to S1008 are executed. When the main frame search has been completed in the entire focus detection region in step S1009, the main frame selection processing is completed.

Figure 14:
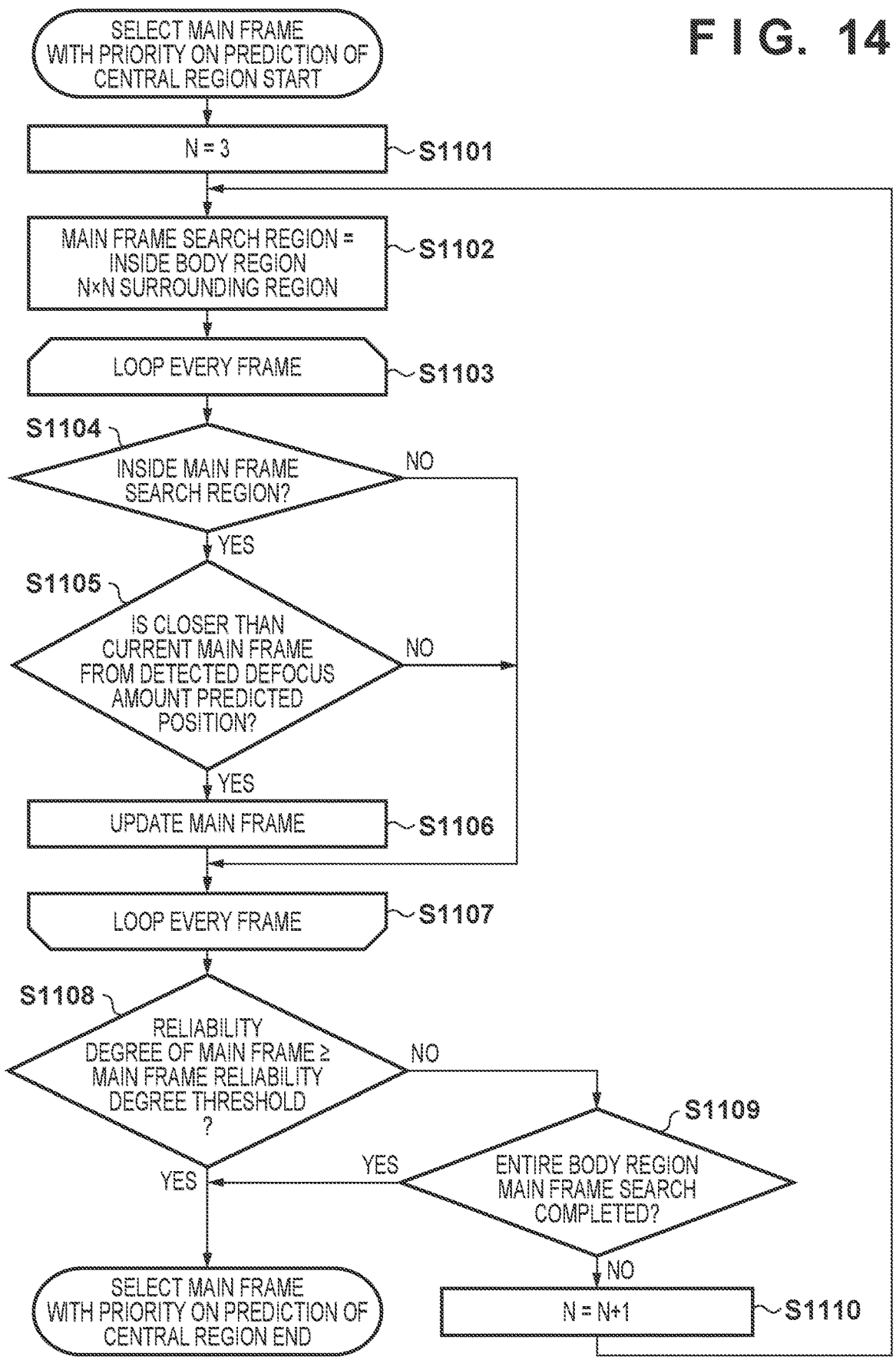
FIG. 14 is a flowchart illustrating the operations for selecting an AF main frame with priority on prediction in a central region.

Furthermore, in a scene that has a high risk of, for example, absence of the subject irrespective of the detected part of the subject, such as a case where the motion of the subject is strenuous, main frame selection processing may be set based on the determination about whether a focus adjustment mode is a mode for shooting of a motionless object (a motionless subject) or a mode for shooting of a dynamic object (a moving subject). In the case of the mode for shooting of a dynamic object, the focus position is tracked by predicting the subject position in a target frame from history information of the subject positions in a plurality of frames from the past. The present modification example will be described using processing for preferentially selecting, as a main frame, a focus detection frame indicating a position that is close to the aforementioned predicted subject position. FIG. 14 is a flowchart showing the operations for selecting the main frame with priority on prediction in the central region.

In step S1101, the system control unit 209 configures the initial setting of the number of frames for setting a main frame search region in the next step S1102. The system control unit 209 sets the main frame search region in step S1102, and proceeds to step S1103.

From step S1103 to step S1107, similar processing is executed with respect to every focus detection frame inside the focus detection region. In step S1104, the system control unit 209 determines whether the focus detection frame is inside the main frame search region; when the focus detection frame is inside the main frame search region, processing proceeds to step S1105. In step S1105, whether the focus detection frame is closer than the main frame currently set to the subject position predicted from the detected defocus amount and the current lens position is determined. When the focus detection frame is closer, the main frame is updated in the next step S1106; when the focus detection frame is farther, processing proceeds to S1107, thereby proceeding to the determination about the next focus detection frame. The foregoing processing is executed with respect to every focus detection frame, and processing proceeds to step S1108.

In step S1108, the system control unit 209 judges whether the reliability degree of the detected defocus amount of the selected main frame is equal to or higher than a predetermined threshold. When the reliability degree is judged to be equal to or higher than the predetermined threshold in step S1108, the main frame selection processing is completed. When the reliability degree is judged to be lower in step S1108, processing proceeds to steps S1109 and S1110, the main frame search region is enlarged, and the aforementioned steps S1102 to S1108 are executed. When the main frame search has been completed in the entire focus detection region in step S1109, the main frame selection processing is completed.

Application of the present modification example enables the execution of accurate focus adjustment in a region with a higher priority degree, also with respect to a subject with strenuous motion, while avoiding regions in which focus detection is difficult.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments but is defined by the scope of the following claims.

What is claimed is:

1. An image capturing apparatus, comprising:
an image sensor configured to capture an image of a subject;
at least one processor; and
a memory coupled to the at least one processor storing instructions that, when executed by the at least one processor, cause the at least one processor to function as:
a detection unit configured to detect the subject from the image captured by the image sensor;
a setting unit configured to set within a part of the subject detected by the detection unit a main focus detection area;
a focus detection unit configured to detect a focus state of the main focus detection area; and
a focus control unit configured to control a focus lens based on the focus state of the main focus detection area,
wherein the setting unit is configured to cause a method of setting the main focus detection area within the part of the subject to vary depending on the part of the subject detected by the detection unit,
wherein the setting unit is further configured to set a plurality of focus detection areas including the main focus detection area corresponding to the part of the subject detected by the detection unit,
wherein the setting unit is configured to, when the detection unit has detected a plurality of parts of the subject corresponding to a plurality of detected regions, set the plurality of focus detection areas with respect to a region that includes the plurality of detected regions, and
wherein the setting unit is configured to set the plurality of focus detection areas based on a size of the smallest one of the detected regions corresponding to the parts of the subjects detected by the detection unit.

2. The image capturing apparatus according to claim 1, wherein the setting unit is configured to, when a pupil has been detected as the part of the subject, set the main focus detection area with priority on a center of the part.

3. The image capturing apparatus according to claim 1, wherein the setting unit is configured to, when a face has been detected as the part of the subject, set the main focus detection area with priority on a center of the part.

4. The image capturing apparatus according to claim 1, wherein the setting unit is configured to, when a pupil or a face has been detected as the part of the subject, set the main focus detection area with priority on a center of the part.

5. The image capturing apparatus according to claim 1, wherein the setting unit is configured to, when a body has been detected as the part of the subject, set the main focus detection area with priority on a closest subject.

6. The image capturing apparatus according to claim 1, wherein the setting unit is configured to cause the method of setting the main focus detection area to vary between a case where the subject is a motionless subject and a case where the subject is a moving subject.

7. The image capturing apparatus according to claim 1, wherein the setting unit is configured to cause the method of setting the main focus detection area to vary between a case where a focus adjustment mode is a mode for focusing on a motionless subject and a case where the focus adjustment mode is a mode for focusing on a moving subject.

8. The image capturing apparatus according to claim 1, wherein the setting unit is configured to cause the method of setting the main focus detection area to vary depending on a size of the part detected by the detection unit.

9. The image capturing apparatus according to claim 1, wherein the setting unit is configured to set the main focus detection area based on the result of the detection by the detection unit, the setting of the setting unit, and the result of the detection by the focus detection unit.

10. A method of controlling an image capturing apparatus having an image sensor configured to capture an image of a subject, the method comprising:
detecting the subject from the image captured by the image sensor;
setting within a part of the subject detected by the detection unit a main focus detection area;
detecting a focus state of the main focus detection area; and
controlling a focus lens based on the focus state of the main focus detection area, wherein the setting causes a method of setting the main focus detection area within the part of the subject to vary depending on the part of the subject detected in the detecting, wherein the setting further sets a plurality of focus detection areas including the main focus detection area corresponding to the part of the subject detected in the subject detecting, wherein the setting, when the subject detecting has detected a plurality of parts of the subject corresponding to a plurality of detected regions, sets the plurality of focus detection areas with respect to a region that includes the plurality of detected regions, and wherein the setting sets the plurality of focus detection areas based on a size of the smallest one of the detected regions corresponding to the parts of the subjects detected in the subject detecting.

11. The method according to claim 10,
wherein the setting, when a pupil has been detected as the part of the subject, sets the main focus detection area with priority on a center of the part.

12. The method according to claim 10,
wherein the setting, when a face has been detected as the part of the subject, sets the main focus detection area with priority on a center of the part.

13. The method according to claim 10,
wherein the setting, when a body has been detected as the part of the subject, sets the main focus detection area with priority on a closest subject.

14. A non-transitory computer readable storage medium storing a program for causing a computer to execute a method of controlling an image capturing apparatus having an image sensor configured to capture an image of a subject, the method comprising:

detecting the subject from the image captured by the image sensor;

setting within a part of the subject detected by the detection unit a main focus detection area;

detecting a focus state of the main focus detection area; and controlling a focus lens based on the focus state of the main focus detection area, wherein the setting causes a method of setting the main focus detection area within the part of the subject to vary depending on the part of the subject detected in the detecting, wherein the setting further sets a plurality of focus detection areas including the main focus detection area corresponding to the part of the subject detected in the subject detecting, wherein the setting, when the subject detecting has detected a plurality of parts of the subject corresponding to a plurality of detected regions, sets the plurality of focus detection areas with respect to a region that includes the plurality of detected regions, and wherein the setting sets the plurality of focus detection areas based on a size of the smallest one of the detected regions corresponding to the parts of the subjects detected in the subject detecting.

15. The non-transitory computer readable storage medium according to claim 14,
wherein the setting, when a pupil has been detected as the part of the subject, sets the main focus detection area with priority on a center of the part.

16. The non-transitory computer readable storage medium according to claim 14,
wherein the setting, when a face has been detected as the part of the subject, sets the main focus detection area with priority on a center of the part.

17. The non-transitory computer readable storage medium according to claim 14,
wherein the setting, when a body has been detected as the part of the subject, sets the main focus detection area with priority on a closest subject.

* * * * *